US010024250B2

(12) United States Patent
Shirahashi et al.

(10) Patent No.: US 10,024,250 B2
(45) Date of Patent: Jul. 17, 2018

(54) FUEL INJECTION CONTROL APPARATUS FOR ENGINE

(71) Applicant: Mazda Motor Corporation, Aki-gun, Hiroshima (JP)

(72) Inventors: Naotoshi Shirahashi, Hiroshima (JP); Tsunehiro Mori, Aki-gun (JP); Takahiro Yamamoto, Aki-gun (JP); Takeshi Matsubara, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 124 days.

(21) Appl. No.: 15/156,167

(22) Filed: May 16, 2016

(65) Prior Publication Data

US 2016/0341135 A1    Nov. 24, 2016

(30) Foreign Application Priority Data

May 18, 2015   (JP) ................................. 2015-101196

(51) Int. Cl.
*B60T 7/12*   (2006.01)
*F02D 35/02*  (2006.01)
*F02D 41/40*  (2006.01)
*F02D 41/28*  (2006.01)

(52) U.S. Cl.
CPC ......... *F02D 35/027* (2013.01); *F02D 35/023* (2013.01); *F02D 35/025* (2013.01); *F02D 41/402* (2013.01); *F02D 41/403* (2013.01); *F02D 41/405* (2013.01); *F02D 2041/288* (2013.01); *Y02T 10/44* (2013.01)

(58) Field of Classification Search
CPC ................... F02B 19/1085; F02D 1/16; F02D 2001/0085; F02D 41/34; F02D 41/40; F02M 41/1411
USPC ........ 701/103, 105; 123/434, 435, 673, 687, 123/690
See application file for complete search history.

(56) References Cited

U.S. PATENT DOCUMENTS

| 2017/0101944 A1* | 4/2017 | Umeno ................. F02D 35/027 |
| 2017/0184047 A1* | 6/2017 | Shirahashi ............ F02D 41/402 |
| 2017/0184048 A1* | 6/2017 | Shirahashi ............... F02B 3/12 |
| 2017/0184049 A1* | 6/2017 | Shirahashi ............... F02B 3/12 |

FOREIGN PATENT DOCUMENTS

JP           3803903 B2     8/2006

* cited by examiner

*Primary Examiner* — John Kwon
(74) *Attorney, Agent, or Firm* — Alleman Hall Creasman & Tuttle LLP

(57) ABSTRACT

A fuel injection control apparatus for an engine in which fuel is injected into a cylinder a plurality of times to cause a plurality of combustions is provided, which includes a controller for controlling a time interval of performing the plurality of fuel injections so that a waveform indicating a frequency characteristic of a combustion pressure wave that is produced by each of the plurality of combustions has valley points at frequencies within a plurality of resonant frequency bands of a structural system of the engine, respectively.

9 Claims, 13 Drawing Sheets

| FREQUENCY [Hz] | VALLEY POINT CYCLE [msec] | HEAT GENERATION INTERVAL [deg] |
|---|---|---|
| 1300 | 0.4 | 3.5 |
| | 1.2 | 10.4 |
| | 1.9 | 17.3 |
| | 2.7 | 24.2 |
| | 3.5 | 31.2 |
| 1700 | 0.3 | 2.6 |
| | 0.9 | 8.1 |
| | 1.5 | 13.2 |
| | 2.1 | 18.5 |
| | 2.6 | 23.8 |
| 2500 | 0.2 | 1.8 |
| | 0.6 | 5.4 |
| | 1.0 | 9.0 |
| | 1.4 | 12.6 |
| | 1.8 | 16.2 |

FIG. 12

FUEL INJECTION CONTROL APPARATUS FOR ENGINE

BACKGROUND

The present invention relates to a fuel injection control apparatus for an engine, particularly to a fuel injection control apparatus for an engine which injects fuel into a cylinder a plurality of times to cause a plurality of combustions therein.

Conventionally, various kinds of measures are conducted to reduce noises in diesel engines, particularly the noise caused by knocking in the engine (hereinafter, simply referred to as "knocking noise"). For example, JP3803903B2 discloses an art of calculating a target value of a produced time difference between combustion pressure waves which are produced by a plurality of fuel injections, respectively, and controlling a time interval of the plurality of fuel injections based on the target value. A time difference with which the combustion pressure waves interfere with each other and a pressure level can be lowered within a high frequency band is calculated as the target value. With this art, by controlling the time interval of the fuel injections, a frequency component of pressure inside a cylinder (in-cylinder pressure) is reduced by targeting a specific frequency band (2.8 to 3.5 kHz), so as to reduce the knocking noise. Note that the phrase "combustion pressure wave" indicates a pressure wave produced when the in-cylinder pressure dramatically increases due to the combustion inside the engine, and corresponds to a result of differentiating the waveform of the in-cylinder pressure by time (similar for below).

The knocking noise caused in the engine has transmission characteristics of a structural system of the engine, particularly characteristics corresponding to resonant frequencies of the structural system of the engine. Specifically, the knocking noise tends to increase within a frequency band including the resonant frequencies of the structural system of the engine (a frequency band having a certain width due to combined resonances of certain components located on a substantial transmission path of the engine). Hereinafter, such a frequency band relating to the resonant frequency is referred to as the "resonant frequency band." Although a structural system of an engine generally has a plurality of resonant frequency bands, with the art of JP3803903B2 described above, only the knocking noise within the specific frequency band of 2.8 to 3.5 kHz can be reduced, and the knocking noise occurring within the plurality of resonant frequency bands of the structural system of the engine cannot suitably be reduced.

Meanwhile, the knocking noise has characteristics corresponding to, in addition to the resonant frequencies of the structural system of the engine described above, an in-cylinder pressure level corresponding to a combustion excitation force. The in-cylinder pressure level is commonly referred to as "CPL (Cylinder Pressure Level)" and indicates high frequency energy obtained by Fourier transforming an in-cylinder pressure waveform with respect to a combustion excitation force index. Hereinafter, the in-cylinder pressure level is simply referred to as the "CPL." The CPL corresponds to a heat generation rate indicating a combustion mode inside the cylinder. According to experiments conducted by the present inventors, it was found that a waveform of the heat generation rate changes under influences of environmental conditions, such as temperature and pressure, and the knocking noise receives an influence of such change in the waveform of the heat generation rate. Therefore, the present inventors came to establish an idea that in order to suitably reduce the knocking noise, it is preferable to set a time interval of a plurality of fuel injections based on a timing at which a highest value (peak) of the heat generation rate taking into consideration the influences from the environmental conditions (e.g., the temperature and pressure) is obtained. With the art of JP3803903B2 described above, since the time interval of the plurality of fuel injections is controlled based on a timing at which the combustion pressure wave rises (corresponding to a timing at which the heat generation rate starts to increase), the reduction of the knocking noise is not sufficient.

SUMMARY

The present invention is made in view of solving the problems of the conventional art described above, and aims to provide a fuel injection control apparatus for an engine which can suitably reduce knocking noise occurring at resonant frequencies of a structural system of an engine.

According to one aspect of the present invention, a fuel injection control apparatus for an engine in which fuel is injected into a cylinder a plurality of times to cause a plurality of combustions is provided, which includes a controller for controlling a time interval of performing the plurality of fuel injections so that a waveform indicating a frequency characteristic of a combustion pressure wave that is produced by each of the plurality of combustions has valley points at frequencies within a plurality of resonant frequency bands of a structural system of the engine, respectively.

With the above configuration, since the time interval of performing the plurality of fuel injections is controlled so that the waveform has the valley points at the frequencies within the plurality of resonant frequency bands, respectively, knocking noise which occurs within the plurality of resonant frequency bands can suitably be reduced. In this case, an entire level (i.e., values of high and low peaks) of the combustion pressure wave is not changed, and fuel consumption and emission performance do not degrade. Also, since no additional component such as a sound insulator is added, the cost and the weight of the apparatus are not increased.

Note that the phrase "the frequency characteristic of the combustion pressure wave" corresponds to a frequency characteristic of an in-cylinder pressure level (CPL) corresponding to the combustions in the engine.

The controller may control the time interval of performing the plurality of fuel injections to overlap a mountain point of a first combustion pressure wave with a valley point of a second combustion pressure wave within each of the plurality of resonant frequency bands, so that the frequencies of the valley points of the waveform indicating the frequency characteristic of each combustion pressure wave are included in the plurality of resonant frequency bands, respectively, the first combustion pressure wave and the second combustion pressure wave produced by two of the plurality of combustions that are adjacent to each other in terms of timing.

With the above configuration, the mountain point of the first combustion pressure wave is overlapped with the valley point of the second combustion pressure wave. Thereby, the frequencies of the valley points of the waveform can suitably be included in the plurality of resonant frequency bands of the structural system of the engine, respectively, and the knocking noise can effectively be reduced.

The controller may control the time interval of performing the plurality of fuel injections to achieve a target time interval at which a heat generation rate caused by each of the plurality of combustions reaches a highest value, so that the frequencies of the valley points of the waveform are included in the plurality of resonant frequency bands, respectively.

With the above configuration, the time interval of performing the plurality of fuel injections is set based on the time interval at which the heat generation rate reaches the highest value taking into consideration influences from environmental conditions (e.g., the temperature and pressure). Therefore, the frequencies of the valley points of the waveform can certainly be included in the plurality of resonant frequency bands of the structural system of the engine, respectively.

The controller may obtain, as the target time interval, the time interval at which the heat generation rate reaches the highest value based on a temperature inside the cylinder of the engine and pressure inside an intake manifold of the engine, and may control the time interval of performing the plurality of fuel injections to achieve the target time interval.

With the above configuration, by using the temperature inside the cylinder of the engine and the pressure inside the intake manifold of the engine, the time interval at which the heat generation rate reaches the highest value can accurately be obtained.

According to another aspect of the present invention, a fuel injection control apparatus for an engine in which fuel is injected into a cylinder a plurality of times to cause a plurality of combustions is provided, which includes a controller for controlling a time interval of performing the plurality of fuel injections based on a time interval at which a heat generation rate caused by each of the plurality of combustions reaches a highest value, so that a waveform indicating a frequency characteristic of a combustion pressure wave produced by each of the plurality of combustions has valley points at frequencies within a plurality of resonant frequency bands of a structural system of the engine, respectively.

With the above configuration, the time interval of performing the plurality of fuel injections is controlled based on the time interval at which the heat generation rate reaches the highest value taking into consideration influences from the environmental conditions (e.g., the temperature and pressure) so that the waveform has valley points at frequencies within the plurality of resonant frequency bands of the structural system of the engine, respectively. Therefore, the knocking noise which occurs within the plurality of resonant frequency bands of the structural system of the engine can suitably be reduced.

The controller may obtain timings at which the heat generation rate reaches the highest value based on a temperature inside the cylinder of the engine to obtain the interval of the timings, each of the timings being advanced as the temperature inside the cylinder becomes higher.

With the above configuration, the timings at which the heat generation rate reaches the highest value can accurately be obtained based on the temperature inside the cylinder of the engine.

The controller may obtain timings at which the heat generation rate reaches the highest value based on pressure inside an intake manifold of the engine to obtain the interval of the timings, each of the timings being advanced as the pressure inside the intake manifold becomes higher.

With the above configuration, the timings at which the heat generation rate reaches the highest value can accurately be obtained based on the pressure inside the intake manifold of the engine.

According to yet another aspect of the present invention, a fuel injection control apparatus for an engine in which fuel is injected into a cylinder a plurality of times to cause a plurality of combustions is provided, which includes a controller for controlling reference injection timings of the plurality of fuel injections based on at least an operating state of the engine. The controller changes the reference injection timings by controlling a time interval of performing the plurality of fuel injections so that within a resonant frequency band of a structural system of the engine, a combustion pressure wave produced by each of the plurality of combustions indicates a value lower than that of the combustion pressure wave when the reference injection timings are applied.

With the above configuration, the time interval of performing the plurality of fuel injections is controlled so that within the resonant frequency band of the structural system of the engine, the combustion pressure wave produced by each of the plurality of combustions indicates the value lower than that of the combustion pressure wave when the reference injection timings are applied. Therefore, the knocking noise which occurs within the plurality of resonant frequency bands of the structural system of the engine can suitably be reduced.

Among a plurality of fuel injection time intervals at which the combustion pressure wave indicates a value lower than when the reference injection timings are applied within the resonant frequency band, the controller may apply a time interval that is closest to the fuel injection time interval corresponding to the reference injection timings.

With the above configuration, the time interval that is close to the fuel injection time interval corresponding to the reference injection timings is applied. Therefore, the knocking noise can suitably be reduced while further effectively preventing the degradation of the fuel consumption and the emission performance.

BRIEF DESCRIPTION OF THE DRAWINGS

FIG. 12 is a table illustrating specific examples of the heat generation interval for controlling the valley points of the waveform of the CPL in the embodiment of the present invention.

DETAILED DESCRIPTION OF EMBODIMENT

Hereinafter, a fuel injection control apparatus for an engine according to one embodiment of the present invention is described with reference to the appended drawings.
<Apparatus Configuration>

First, a diesel engine system to which the fuel injection control apparatus for the engine according to this embodiment is applied is described with reference to FIG. 1 which is a schematic view illustrating an entire configuration of the diesel engine system.

Figure 1:
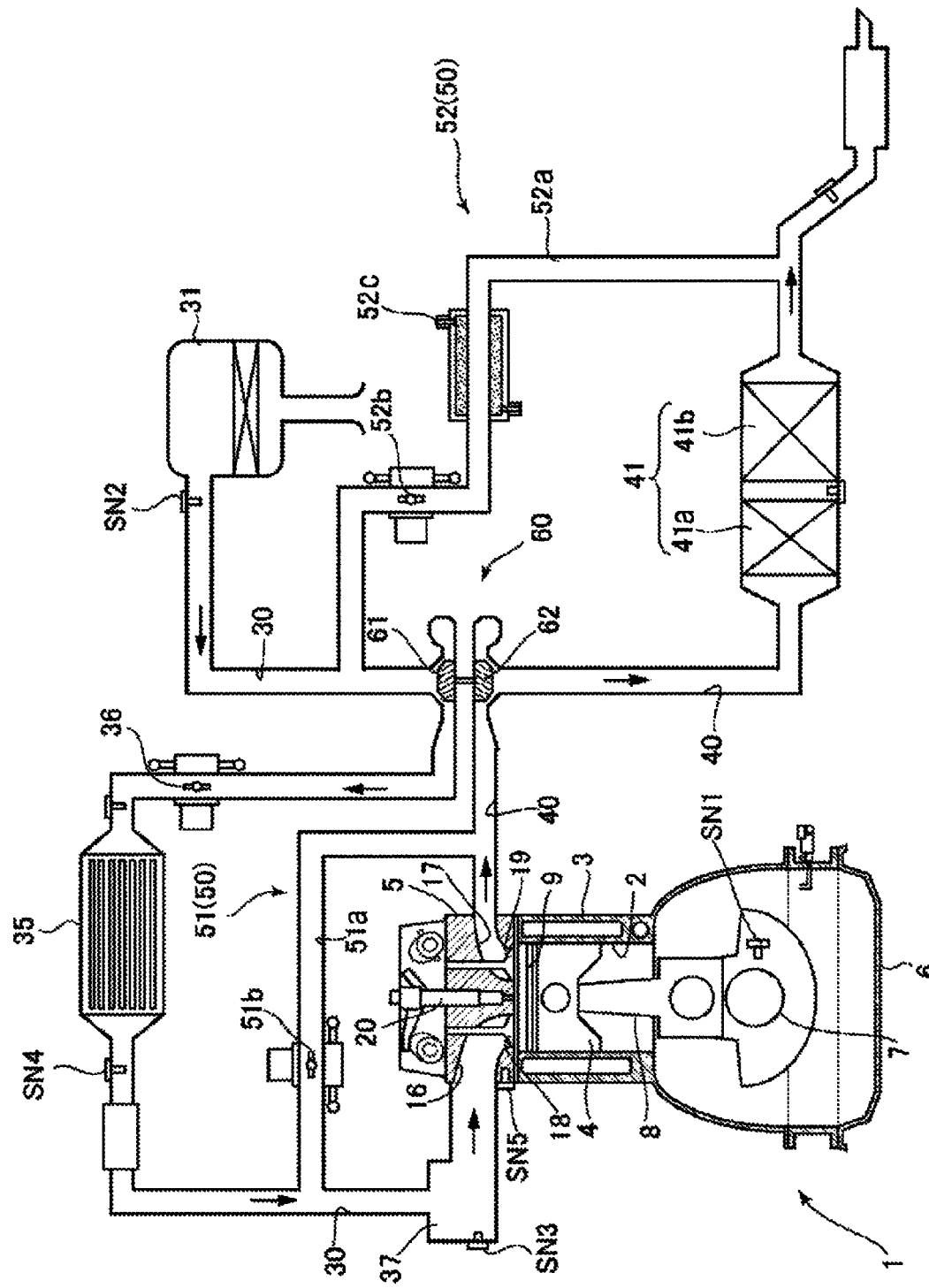
FIG. 1 is a schematic view illustrating an entire configuration of a diesel engine system to which a fuel injection control apparatus for an engine according to one embodiment of the present invention is applied.

The diesel engine illustrated in FIG. 1 is a four-cycle diesel engine mounted on a vehicle as a traveling drive source. Specifically, the diesel engine includes an engine body 1 having a plurality of cylinders 2 and for being driven by receiving fuel that contains diesel oil as a main component, an intake passage 30 for introducing air to be used for combustion into the engine body 1, an exhaust passage 40 through which exhaust gas generated in the engine body 1 is discharged, an EGR device 50 for recirculating part of the exhaust gas passing through the exhaust passage 40 back to the intake passage 30, and a turbocharger 60 for being driven by the exhaust gas passing through the exhaust passage 40.

In the intake passage 30, an air cleaner 31, a compressor 61 of the turbocharger 60, a throttle valve 36, an intercooler 35, and a surge tank 37 are provided in this order from an upstream side. In the intake passage 30, independent passages communicating the respective cylinders 2 are formed downstream of the surge tank 37, and gas inside the surge tank 37 is distributed to the cylinders 2 through the independent passages, respectively.

In the exhaust passage 40, a turbine 62 of the turbocharger 60 and an exhaust emission control system 41 are provided in this order from an upstream side.

In the turbocharger 60, the turbine 62 rotates in response to receiving energy of the exhaust gas flowing through the exhaust passage 40 and the compressor 61 rotates in conjunction with the turbine 62. Thus, the turbocharger 60 compresses (turbocharges) air flowing through the intake passage 30.

The intercooler 35 cools the air compressed by the compressor 61.

The throttle valve 36 opens and closes the intake passage 30. Note that in this embodiment, the throttle valve 36 is basically kept fully or close to fully opened while the engine is in operation, and the throttle valve 36 is closed to block the intake passage 30 only when necessary, such as when the engine is stopped.

The exhaust emission control system 41 purifies hazardous components within the exhaust gas. In this embodiment, the exhaust emission control system 41 includes an oxidation catalyst 41a for oxidizing CO and HC within the exhaust gas, and a DPF 41b for capturing soot within the exhaust gas.

The EGR device 50 recirculates the exhaust gas back to the intake side. In this embodiment, a high-pressure EGR device (hereinafter, may be referred to as the "HP_EGR device") 51 and a low-pressure EGR device (hereinafter, may be referred to as the "LP_EGR device") 52 are provided as the EGR device 50.

The HP_EGR device 51 includes an HP_EGR passage 51a connecting a part of the exhaust passage 40 upstream of the turbine 62 with a part of the intake passage 30 downstream of the intercooler 35, and an HP_EGR valve 51b for opening and closing the HP_EGR passage 51a. The HP_EGR device 51 recirculates comparatively-high-pressure exhaust gas discharged to the exhaust passage 40 (high-pressure EGR gas) back to the intake side.

The LP_EGR device 52 includes an LP_EGR passage 52a connecting a part of the exhaust passage 40 downstream of the DPF 41b with a part of the intake passage 30 between the air cleaner 31 and the compressor 61, and an LP_EGR valve 52b for opening and closing the LP_EGR passage 52a. The LP_EGR device 52 recirculates comparatively-low-pressure exhaust gas discharged to the exhaust passage 40 (low-pressure EGR gas) back to the intake side. An EGR cooler 52c for cooling the low-pressure EGR gas passing through the LP_EGR passage 52a is provided in a part of this passage 52a upstream of the LP_EGR valve 52b (exhaust passage 40 side).

The engine body 1 includes a cylinder block 3 formed therein with the cylinders 2 extending in up-and-down directions of the engine body 1, pistons 4 fitted into the respective cylinders to be able to reciprocate (move in the up-and-down directions), a cylinder head 5 provided to cover end surfaces (top surfaces) of the cylinders from a side of crown faces of the pistons 4, and an oil pan 6 disposed below the cylinder block 3 to store lubrication oil.

The pistons 4 are coupled to a crankshaft 7 that is an output shaft of the engine body 1, via connecting rods 8, respectively. Further, combustion chambers 9 are formed on the pistons 4, respectively. In each combustion chamber 9, the fuel injected by an injector 20 (described later) causes diffusion combustion while being mixed with the air to form mixture gas. Moreover, the piston 4 reciprocates by receiving expansion energy of the combustion, and thus, the crankshaft 7 rotates about a center axis thereof.

Here, a geometric compression ratio of the engine body 1, specifically, a ratio of a combustion chamber volume when the piston 4 is at a bottom dead center (BDC) to a combustion chamber volume when the piston 4 is at a top dead center (TDC) is designed to be between 12:1 and 15:1 (e.g., 14:1). Although the geometric compression ratio between 12:1 and 15:1 is a significantly low value for a diesel engine, such a ratio is designed so that a combustion temperature can be lowered so as to improve emission performance and thermal efficiency.

The cylinder head 5 is provided with intake ports 16 for introducing the air supplied from the intake passage 30 into the respective combustion chambers 9, exhaust ports 17 for introducing the exhaust gas generated in the respective combustion chambers 9 into the exhaust passage 40, intake valves 18 for opening and closing the respective intake ports 16 on the combustion chamber 9 side, and exhaust valves 19 for opening and closing the respective exhaust ports 17 on the combustion chamber 9 side.

Further, injectors 20 for injecting the fuel to the respective combustion chambers 9 are attached to the cylinder head 5. Each injector 20 is attached in a pose such that a tip part thereof, which is on the piston 4 side, is oriented toward a center portion of a cavity (not illustrated) formed in the crown face of the piston 4. The injector 20 is connected to a pressure accumulation chamber (not illustrated) on a common rail side via a fuel flow path. Inside the pressure accumulation chamber, high-pressure fuel pressured by a fuel pump (not illustrated) is stored, and the injector 20 receives the fuel from the pressure accumulation chamber and injects the fuel into the combustion chamber 9. A fuel pressure regulator (not illustrated) for adjusting an injection pressure that is pressure inside the pressure accumulation chamber, in other words, pressure of the fuel to be injected by the injector 20, is provided between the fuel pump and the pressure accumulation chamber.

Figure 2:
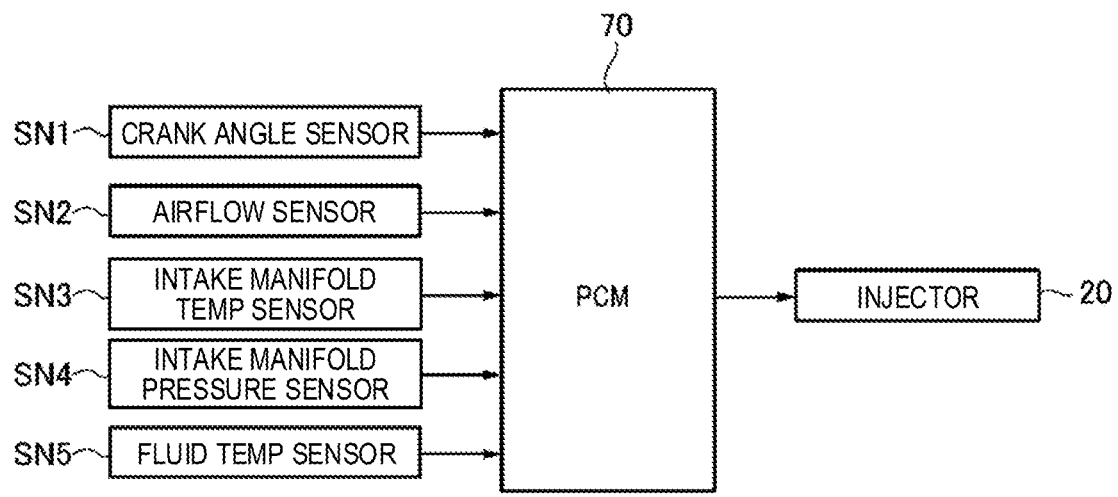
FIG. 2 is a block diagram illustrating a control system of the diesel engine according to the embodiment of the present invention.

Next, a control system of the diesel engine of this embodiment is described with reference to FIG. 2. FIG. 2 is a block diagram illustrating the control system of the diesel engine of this embodiment. As illustrated in FIG. 2, the diesel engine of this embodiment is entirely controlled by a PCM (Powertrain Control Module) 70. The PCM 70 is a microprocessor comprised of a CPU, ROM(s), and RAM(s).

The PCM 70 is electrically connected with various sensors for detecting an operating state of the engine.

For example, the cylinder block 3 is provided with a crank angle sensor SN1 for detecting a rotational angle (crank angle) and rotational speed of the crankshaft 7. The crank angle sensor SN1 outputs pulse signals corresponding to rotation of a crank plate (not illustrated) for integrally rotating with the crankshaft 7, and the rotational angle and rotational speed of the crankshaft 7 (i.e., engine speed) are determined based on the pulse signals.

A part of the intake passage 30 near the air cleaner 31 (a part between the air cleaner 31 and a connecting position of the LP_EGR passage 52a) is provided with an airflow sensor SN2 for detecting an air amount (fresh air amount) passed through the air cleaner 31 and to be sucked into the cylinders 2.

The surge tank 37 is provided with an intake manifold temperature sensor SN3 for detecting a temperature of the gas inside the surge tank 37, in other words, gas to be sucked into the cylinders 2.

A part of the intake passage 30 downstream of the intercooler 35 is provided with an intake manifold pressure sensor SN4 for detecting pressure of air passing through this part, and further pressure of intake air to be sucked into the cylinders 2.

The engine body 1 is provided with a fluid temperature sensor SN5 for detecting a temperature of coolant (e.g., cooling water) for cooling the engine body 1.

The PCM 70 controls the respective components of the engine while performing various determinations and calculations based on input signals from the various sensors described above. For example, the PCM 70 mainly controls the injectors 20, the throttle valve 36, the HP_EGR valve 51b, the LP_EGR valve 52b, the combustion pressure regulator, etc. In this embodiment, as illustrated in FIG. 2, the PCM 70 controls the injectors 20 to perform a control regarding the fuel supplied to the cylinders 2 (fuel injection control). Note that the PCM 70 constitutes "the fuel injection control apparatus of the engine" and functions as a "controller."

Figure 3:
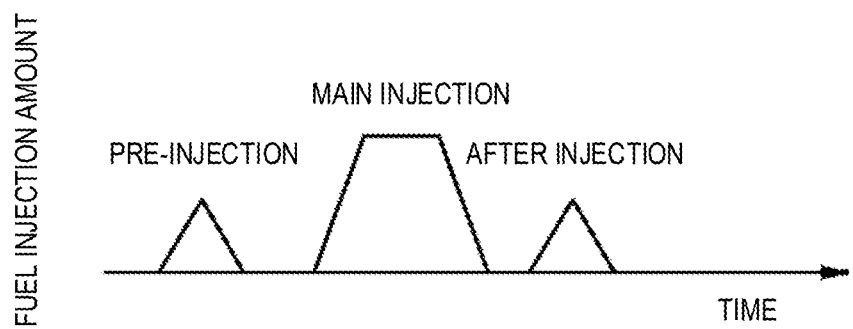
FIG. 3 is a time chart illustrating a representative fuel injection pattern applied in the embodiment of the present invention.

Here, a basic concept of the fuel injection control performed by the PCM 70 in this embodiment is described with reference to FIG. 3. FIG. 3 is a time chart illustrating a representative fuel injection pattern applied in the embodiment of the present invention. In this embodiment, as illustrated in FIG. 3, the PCM 70 performs a main injection in which fuel for generating an engine torque is injected into each combustion chamber 9 near the TDC on compression stroke (CTDC), and a pre-injection in which less fuel than the main injection is injected into the combustion chamber 9 at a timing before the main injection so as to improve air usability and ignitability of the main injection. Additionally, the PCM 70 performs an after injection in which less fuel than the main injection is injected into the combustion chamber 9 at a timing after the main injection so as to combust soot produced inside the combustion chamber 9. For example, the PCM 70 performs the pre-injection and the after injection within a predetermined engine operating range defined beforehand. Hereinafter, timings of performing the pre-injection, the main injection, and the after injection may collectively be referred to as the "injection timings."

In order to generate combustion with a small heat generation by the pre-injection immediately before the fuel of the main injection is combusted so as to create a state where the fuel of the main injection easily combusts, the PCM 70 performs the pre-injection at a timing that fuel spray produced by the pre-injection remains within the cavity formed in the crown face of the piston 4 and comparatively thick mixture gas is formed inside the cavity. Under such a condition, the PCM 70 sets a basic injection timing of the pre-injection (hereinafter, may be referred to as the "reference pre-injection timing") based on a requested output corresponding to an accelerator opening controlled by a vehicle driver, an operating state of the engine (engine speed and engine load), etc. Additionally, the PCM 70 sets a basic injection timing of the after injection (hereinafter, may be referred to as the "reference after injection timing") based on the requested output corresponding to the accelerator opening controlled by the vehicle driver, the operating state of the engine, etc., so that the soot produced inside the combustion chamber 9 by the fuel injections performed before the after injection is suitably combusted by the after injection.

Note that the PCM 70 also sets a basic injection timing of the main injection (hereinafter, may be referred to as the "reference main injection timing") based on the requested output corresponding to the accelerator opening controlled by the vehicle driver, the operating state of the engine, etc. Hereinafter, the reference pre-injection timing, the reference main injection timing, and the reference after injection timing may collectively be referred to, in a simple form, as the "reference injection timings."

<Control Contents in this Embodiment>

Next, the fuel injection control performed by the PCM 70 to reduce knocking noise of the diesel engine in this embodiment is described in detail.

Figure 4:
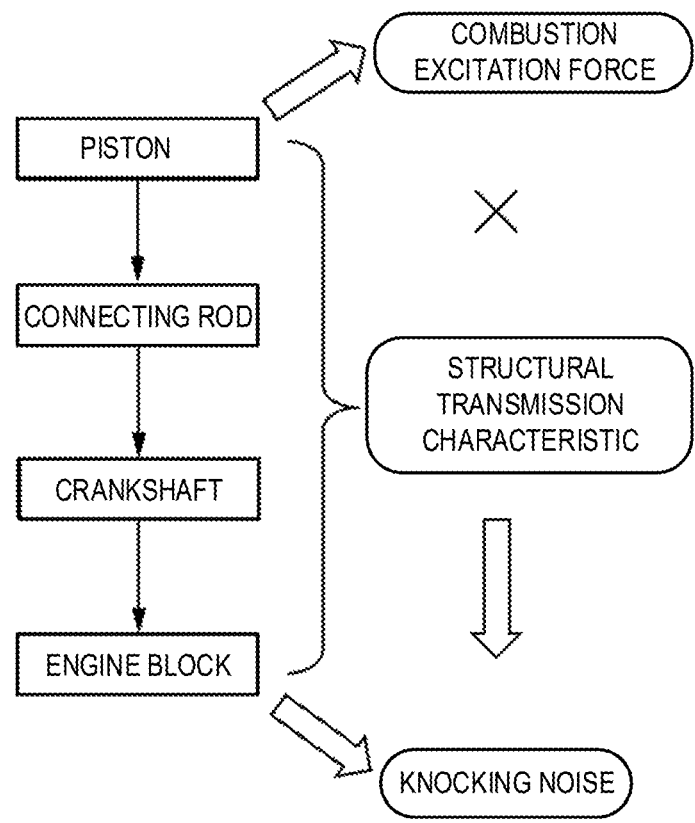
FIG. 4 is a diagram illustrating a mechanism which causes a knocking noise.

First, a mechanism which causes the knocking noise is described with reference to FIGS. 4 and 5. As illustrated in FIG. 4, a combustion excitation force generated by the engine combustion transmits through a main path of force transmission (having a predetermined structural transmission characteristic that corresponds to resonant frequencies of the overall structural system or configuration of the engine), such as the piston, the connecting rod, the crankshaft, and the engine block, and thus, the knocking noise is radiated.

Figure 5:
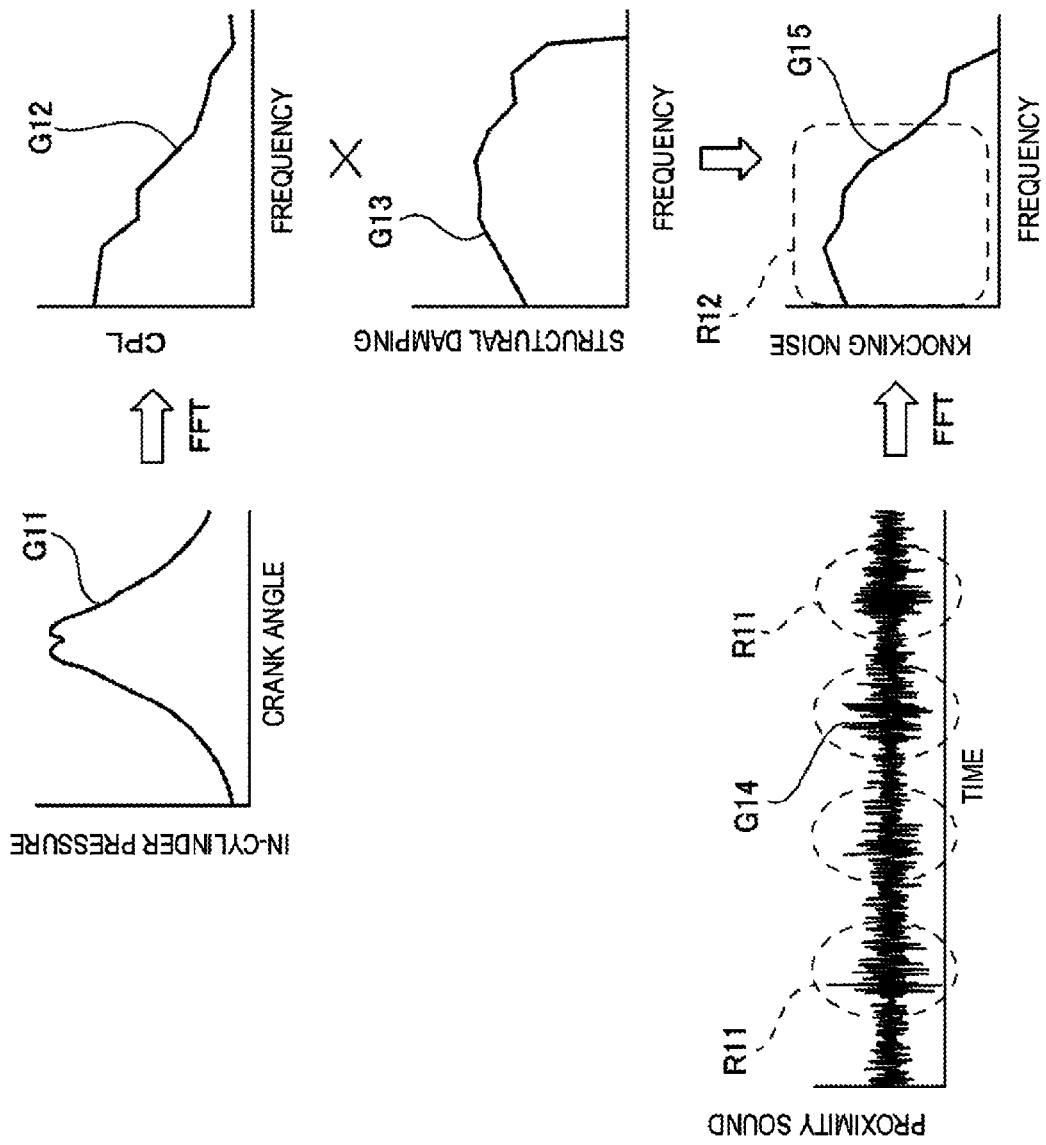
FIG. 5 is another diagram illustrating the mechanism which causes the knocking noise.

In FIG. 5, the chart G11 indicates a relationship between the crank angle and an in-cylinder pressure (combustion pressure), and the chart G12 indicates a frequency characteristic of a CPL corresponding to the combustion excitation force obtained with FFT (Fast Fourier Transform) on the in-cylinder pressure of the chart G11 (high frequency energy of about 1 to 4 kHz obtained with FFT on an in-cylinder pressure waveform by using a combustion excitation force index). Further, the chart G13 indicates a structural transmission characteristic of the engine described above (specifically, a frequency characteristic of structural damping of the engine), and the chart G14 indicates a temporally changing waveform of a proximity sound of the engine. A characteristic that is obtained by applying the structural transmission characteristic of the engine in the chart G13 to the frequency characteristic of the CPL in the chart G12 substantially matches with a characteristic that is obtained with FFT on the temporally changing waveform of the proximity sound of the engine in the chart G14, which indicates a characteristic of the knocking noise (see the chart G15).

Note that portions of the chart G14 where the proximity sound greatly varies temporarily, such as the dashed line ranges R11, are heard as the knocking noise. Further, in the chart G15, a sum of energy of 1 to 4 kHz indicated in the dashed line range R12 is used as a representative value of the knocking noise.

As described above, since the knocking noise receives the influence of the frequency characteristic of the CPL, in this embodiment, the knocking noise is reduced by controlling the frequency characteristic of the CPL. Here, a basic concept of the method of reducing the knocking noise by controlling the frequency characteristic of the CPL in this embodiment is described with reference to FIG. 6. Note that the phrase "the frequency characteristic of the CPL" corresponds to a frequency characteristic of a combustion pressure wave produced by the combustion of the fuel in the engine.

Figure 6:
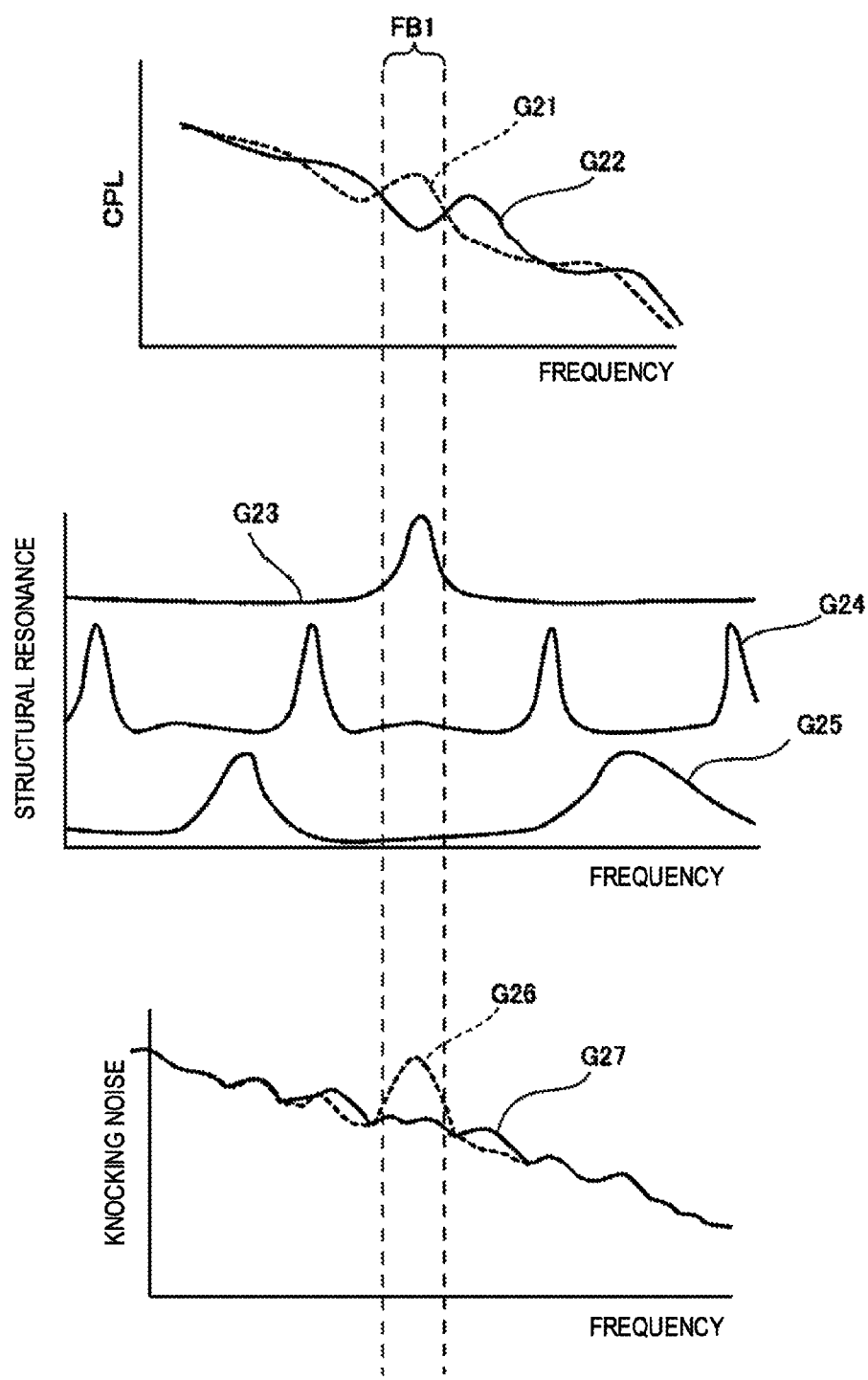
FIG. 6 shows diagrams illustrating a basic concept of a method of reducing the knocking noise by controlling a frequency characteristic of a CPL in the embodiment of the present invention.

In FIG. 6, the chart G21 indicates a reference frequency characteristic of the CPL (e.g., a frequency characteristic of the CPL when the reference injection timings described above are applied), and the charts G23, G24, and G25 indicate frequency characteristics of structural resonances of various components of the engine. For example, the chart G23 indicates the frequency characteristic relating to the structural resonance of the connecting rod of the engine, the chart G24 indicates the frequency characteristic relating to the structural resonance of the crankshaft of the engine, and the chart G25 indicates the frequency characteristic relating to the structural resonance of the engine block. In this embodiment, the structural resonance in the chart G23 applies greater influence on the knocking noise than the structural resonances in the charts G24 and G25 do. In this case, knocking noise having a frequency characteristic as indicated in the chart G26 occurs due to the frequency characteristic of the CPL in the chart G21 and the structural resonances of the engine components indicated in the charts G23 to G25. According to the chart G26, it can be understood that the knocking noise is increased within a frequency band FB1, specifically, it can be understood that the waveform indicating the knocking noise has a high mountain point within the frequency band FB1. The cause of this can be considered to be that the waveform of the CPL in the chart G21 has a mountain point and the waveform indicating the structural resonances of the engine component (the component which greatly influences the knocking noise) corresponding to the chart G23 has a mountain point.

In this embodiment, the frequency characteristic of the CPL is controlled so that a valley point of the waveform indicating the CPL (hereinafter, may simply be referred to as the "CPL waveform") is located within, in other words, a frequency corresponding to the valley point is included in the frequency band FB1 where the waveform indicating the structural resonance of the engine component (the component which greatly influences the knocking noise) corresponding to the chart G23 has the mountain point. Specifically, the frequency characteristic of the CPL is controlled to achieve a frequency characteristic of the CPL as indicated in the chart G22, in which the frequency corresponding to the valley point of the CPL waveform is included within the frequency band FB1. By applying such a frequency characteristic indicated in the chart G22, the knocking noise significantly reduces within the frequency band FB1 as indicated in the chart G27. In this case, since the CPL is not entirely changed, specifically, the values of the high and low peaks are not changed, the knocking noise can suitably be reduced while securing the requested engine output and without degrading fuel consumption and emission performance. Note that the "valley point" used here may indicate a peak (lowest value) of a valley portion of the waveform or a point near the peak or the valley portion itself, and in the case of the valley portion, the "frequency corresponding to the valley point" indicates a frequency band of the valley portion. Similarly, the "mountain point" used here may indicate a peak (highest value) of a mountain portion of the waveform or a point near the peak or the mountain portion itself, and in the case of the mountain portion, the "frequency corresponding to the mountain point" indicates a frequency band of the mountain portion.

Next, a method of controlling the frequency characteristic of the CPL to a desired characteristic (e.g., frequency characteristic as indicated in the chart G22) in this embodiment is described with reference to the FIGS. 7 to 11.

Figure 7A:
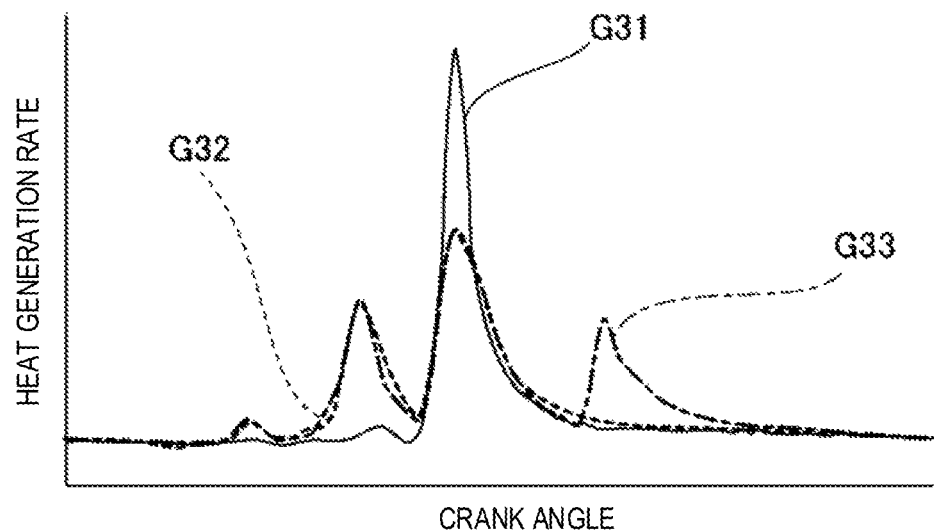
FIGS. 7A and 7B are diagrams illustrating the influence which the frequency characteristic of the CPL receives from changes in number of fuel injections (number of times heat is generated inside the engine).
Figure 7B:
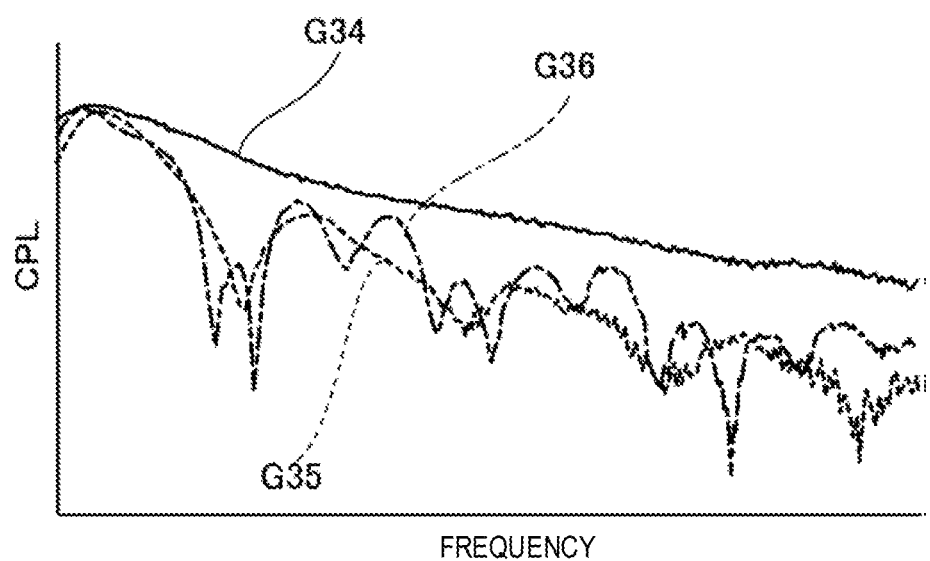

FIGS. 7A and 7B are diagrams illustrating the influence which the frequency characteristic of the CPL receives from changes in number of the fuel injections (the number of times heat is generated inside the engine). In FIGS. 7A and 7B, the chart G31 indicates a waveform of a heat generation rate with respect to the crank angle when the fuel is injected only once (e.g., only the main injection is performed), the chart G32 indicates a waveform of a heat generation rate with respect to the crank angle when the fuel is injected twice (e.g., the pre-injection and the main injection are performed), and the chart G33 indicates a waveform of a heat generation rate with respect to the crank angle when the fuel is injected three times (e.g., the pre-injection, the main injection, and the after injection are performed).

When the fuel is injected only once, as indicated in the chart G34, a frequency characteristic in which the CPL gradually reduces as the frequency increases is obtained. In this case, the waveform indicating the frequency characteristic of the CPL does not have a mountain point nor a valley point. On the other hand, when the fuel is injected twice or three times, as respectively indicated in the charts G35 and G36, the waveform indicating the frequency characteristic of the CPL has mountain points and valley points. Based on this result, it can be considered that by performing two or more fuel injections, or in other words, by causing combustion (heat generation) in the engine two or more times, the waveform indicating the frequency characteristic of the CPL has mountain points and valley points. Moreover, according to the charts G35 and G36, it can be understood that the numbers of the mountain points and the valley points of the waveform indicating the frequency characteristic of the CPL are larger when the fuel is injected three times, compared to when the fuel is injected twice.

Figure 8A:
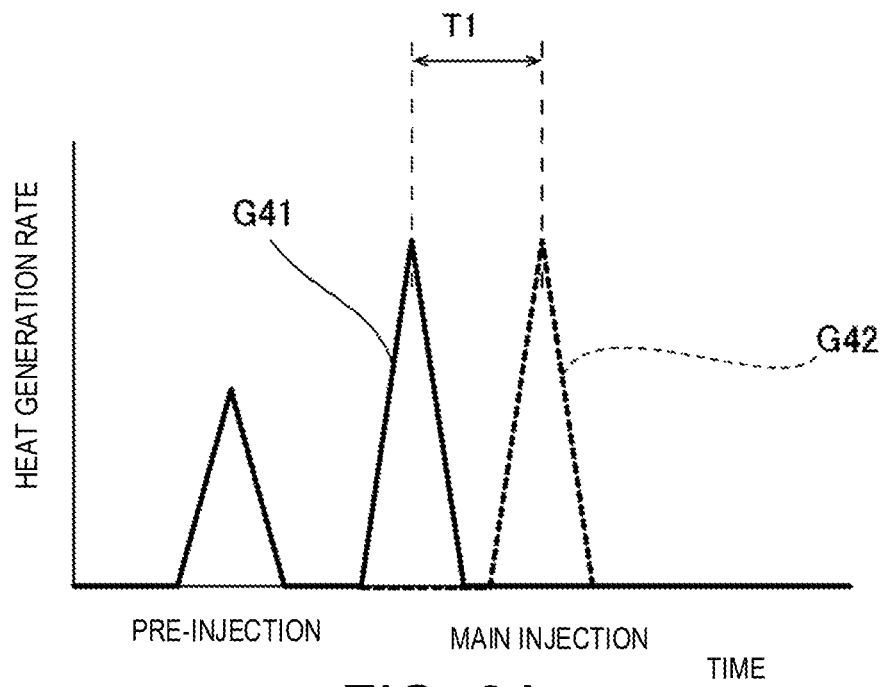
FIGS. 8A and 8B are diagrams illustrating the influence which the frequency characteristic of the CPL receives from changes in timings of performing the fuel injection (causing heat generation) in a case where the fuel is injected twice or more.
Figure 8B:
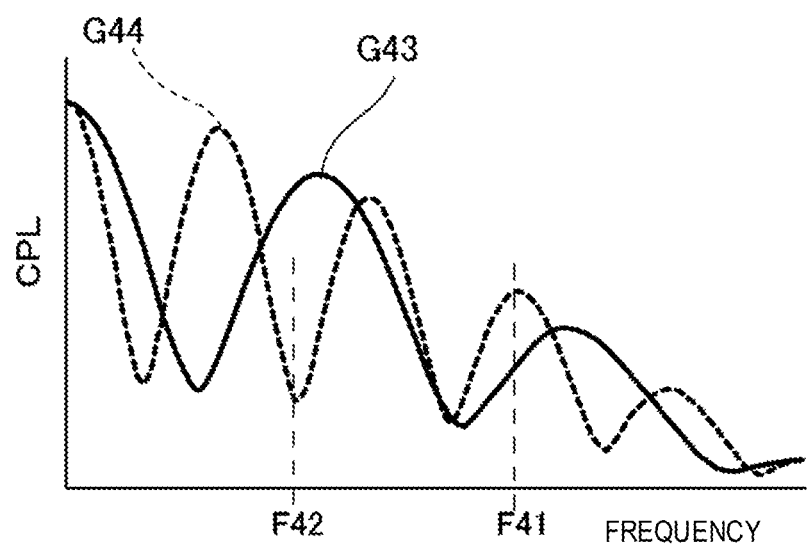

FIGS. 8A and 8B are diagrams illustrating the influence which the frequency characteristic of the CPL receives from changes in timings of performing the fuel injection (causing heat generation) in the case where the fuel is injected twice or more. Here, a simulation result (not an actual experiment result) is described wherein the fuel is injected twice (the pre-injection and the main injection), the timing of performing the early injection (i.e., the pre-injection) is fixed, and the timing of the later injection (i.e., the main injection) is changed.

In FIGS. 8A and 8B, the chart G41 indicates a heat generation rate when the unchanged fuel injection timing (reference injection timing) is applied to the main injection, and the chart G43 indicates the frequency characteristic of the CPL when the heat generation rate in the chart G41 is applied. On the other hand, the chart G42 indicates a heat generation rate when the timing of the main injection is changed (delayed, to be exact) from the reference injection timing. Specifically, the timing at which the heat generation rate reaches a peak (highest value) by the main injection is delayed in the chart G42 from the chart G41 by a time length T1 (e.g., 0.5 msec). When such a heat generation rate of the chart G42 is applied, the frequency characteristic of the CPL as indicated in the chart G44 is obtained.

According to the charts G43 and G44, it can be understood that in the case where the fuel is injected twice, or in other words, the combustion (heat) is generated twice, if one of the timings of the heat generation is changed, the frequency characteristic of the CPL changes, specifically, the numbers of the mountain points and the valley points of the CPL waveform change, or in other words, frequencies of the mountain points and the valley points of the CPL waveform change. Therefore, it can be considered that the timing of the heat generation, particularly, a time interval T1 between the peaks of the heat generation rate in the respective two combustions (hereinafter, suitably referred to as the "heat generation interval T1") influences the frequencies of the mountain points and the valley points of the CPL waveform.

Figure 9B:
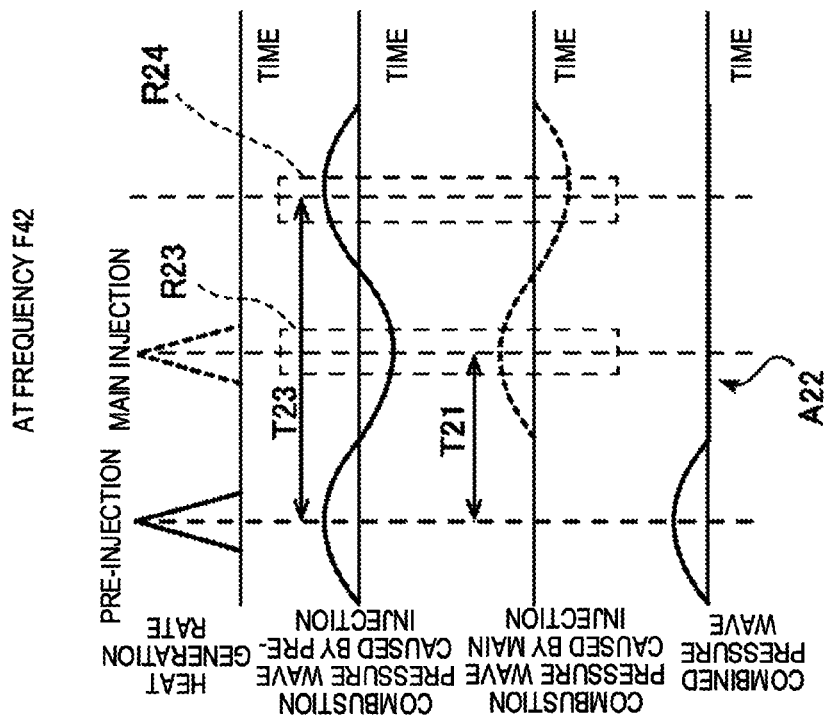
FIGS. 9A and 9B are diagrams illustrating the mechanism which produces a waveform which has mountain and valley points indicating the frequency characteristic of the CPL.
Figure 9A:
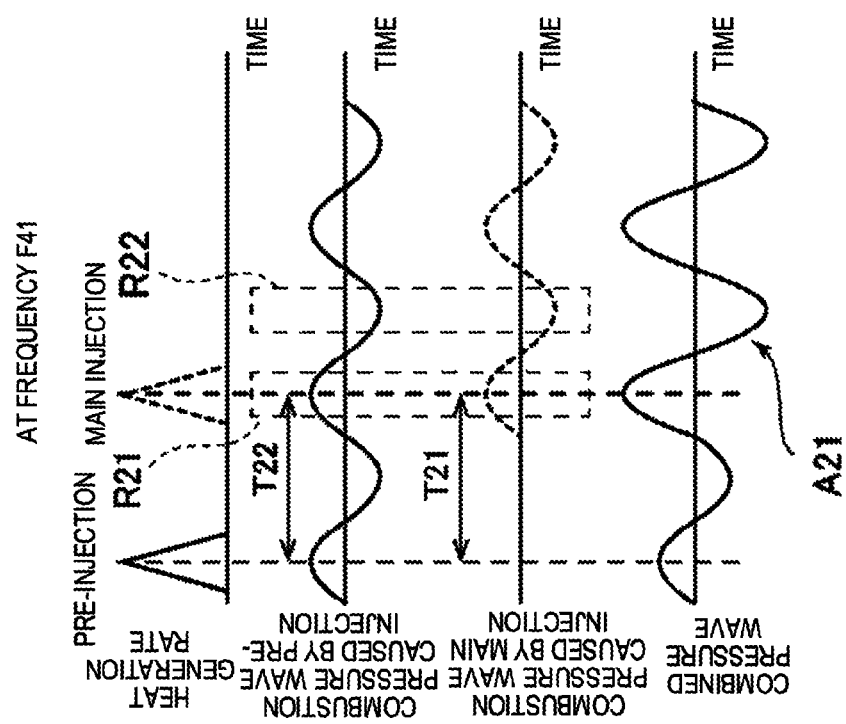

FIGS. 9A and 9B are diagrams illustrating the mechanism which produces the CPL waveform to have the mountain and valley points. FIG. 9A illustrates a temporal change of a combustion pressure wave caused by the pre-injection, a temporal change of a combustion pressure wave caused by the main injection, and a temporal change of a combined pressure wave generated by combining the combustion pressure waves, at a frequency F41 corresponding to one of the mountain points of the CPL waveform of the chart G44 in FIG. 8B. In this case, the time interval between the peaks of the heat generation rate waveform produced by the pre-injection and the main injection, respectively, (heat generation interval) is T21 (similar for below). Further, at the frequency F41 described above, combustion pressure waves having a cycle T22 substantially matching with the heat generation interval T21 are produced by the pre-injection and the main injection, respectively.

At the frequency F41, since the produced timing of the combustion pressure wave by the main injection substantially matches with the cycle T22 of the combustion pressure wave produced by the pre-injection, the combustion pressure waves produced by the pre-injection and the main injection interfere with each other in the same phase. Therefore, the mountain point of the combustion pressure wave produced by the pre-injection overlaps with the mountain point of the combustion pressure wave produced by the main injection (see the dashed line range R21), and the valley point of the combustion pressure wave produced by the pre-injection overlaps with the valley point of the combustion pressure wave produced by the main injection (see the dashed line range R22). Thus, the combined pressure wave obtained by combining the combustion pressure waves produced by the pre-injection and the main injection is amplified (see the arrow A21). As a result, as indicated in the chart G44 of FIG. 8B, the mountain point is formed in the CPL waveform at the frequency F41.

On the other hand, FIG. 9B illustrates a temporal change of a combustion pressure wave caused by the pre-injection, a temporal change of a combustion pressure wave caused by the main injection, and a temporal change of a combined pressure wave produced by combining the combustion pressure waves, at a frequency F42 corresponding to the valley point of the CPL waveform of the chart G44 of FIG. 8B. At the frequency F42, the combustion pressure waves having a cycle T23 corresponding to substantially twice the heat generation interval T21 are produced by the pre-injection and the main injection, respectively.

At the frequency F42, since the combustion pressure wave by the main injection is produced at a timing which corresponds to substantially a median of the cycle T23 of the combustion pressure wave produced by the pre-injection, the combustion pressure waves produced by the pre-injection and the main injection interfere with each other in the opposite phase. Therefore, the valley point of the combustion pressure wave produced by the pre-injection overlaps with the mountain point of the combustion pressure wave produced by the main injection (see the dashed line range R23), and the mountain point of the combustion pressure wave produced by the pre-injection overlaps with the valley point of the combustion pressure wave produced by the main injection (see the dashed line range R24). Thus, the combined pressure wave obtained by combining the combustion pressure waves produced by the pre-injection and the main injection attenuates (see the arrow A22). As a result, as indicated in the chart G44 of FIG. 8B, the valley point is formed in the CPL waveform at the frequency F42.

Here, in the frequency characteristic of the CPL, relationships of the positions of the mountain and valley points with the heat generation interval can be expressed by the following Equations 1 and 2. In Equations 1 and 2, "$\Delta t$" is the heat generation interval and "n" is "1, 2, 3, . . . ."

$$\text{Cycle of Mountain Point } fn = (1/n) \times \Delta t \quad (1)$$

$$\text{Cycle of Valley Point } fn = [2/\{2(n-1)+1\}] \times \Delta t \quad (2)$$

Note that although the results of injecting the fuel twice (the pre-injection and the main injection) are illustrated in FIGS. 8A and 8B, it was confirmed that similar results can also be obtained in the case where the fuel is injected three times (the pre-injection, the main injection, and the after injection). Specifically, when the fuel is injected three times, the frequencies of the mountain and valley points of the CPL waveform also change according to the time interval (heat generation interval) of the peaks of the heat generation rate produced by the three combustions. Further, although the simulation results using predetermined models (e.g., combustion model) are illustrated in FIGS. 8A and 8B, it was confirmed that such results can also be obtained by conducting experiments using an actual structural system. Moreover, although the influence which the frequency characteristic of the CPL receives from the heat generation interval was examined by changing the heat generation interval when the fuel is injected a plurality of times as described above, in addition to the heat generation interval, the present inventors also examined the influence which the frequency characteristic of the CPL receives from changes in height and slope of the heat generation rate waveform. As a result, it was found that even when the height and slope of the heat generation rate waveform are changed, the value of the CPL simply changes and the numbers of the mountain and valley points of the CPL waveform and the frequencies thereof hardly change.

Based on the description given above, it was found that the heat generation interval when the fuel is injected a plurality of times influences the frequency characteristic of the CPL. Thus, in this embodiment, the heat generation interval when the fuel is injected a plurality of times is controlled to obtain a desired frequency characteristic of the CPL (e.g., the frequency characteristic indicated in the chart G22). Specifically, in this embodiment, the PCM 70 sets the time interval of the plurality of fuel injections to achieve a desired heat generation interval with which the desired frequency characteristic of the CPL can be obtained. More specifically, to achieve a frequency characteristic of the CPL in which the frequency corresponding to the valley point of the waveform is included in the resonant frequency band of the structural system of the engine (e.g., see FIG. 6), the PCM 70 sets the time interval of the plurality of fuel injections based on the heat generation interval for obtaining such a frequency characteristic of the CPL.

Figure 10:
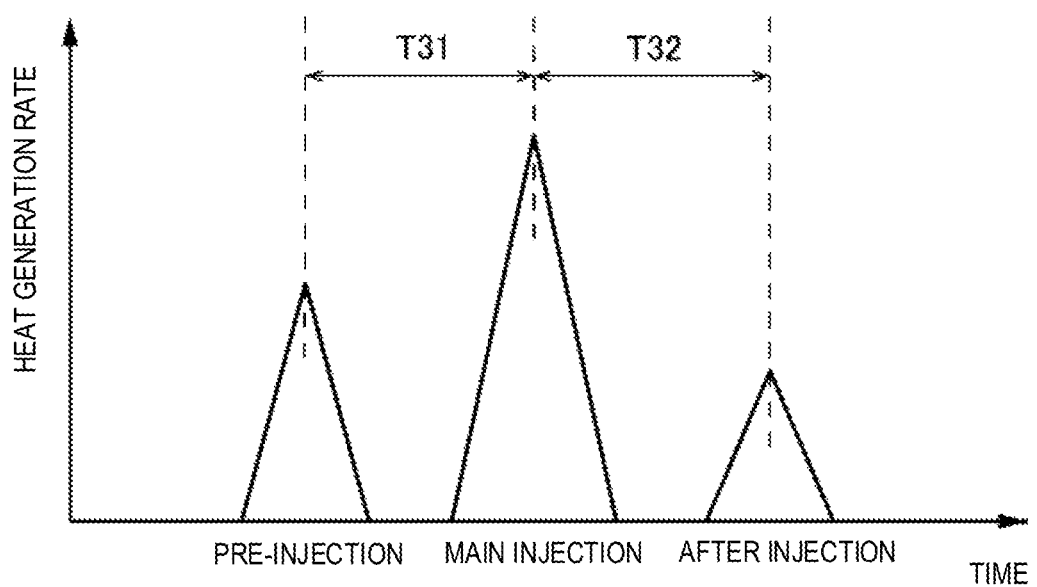
FIG. 10 is a diagram illustrating a basic concept of a control method of a heat generation interval in the embodiment of the present invention.

FIG. 10 is a diagram illustrating a basic concept of a control method of the heat generation interval in this embodiment. FIG. 10 schematically illustrates a heat generation rate caused by the pre-injection, a heat generation rate caused by the main injection, and a heat generation rate caused by the after injection in this order from the left. In this embodiment, the PCM 70 sets the time intervals of the pre-injection, the main injection, and the after injection to achieve a heat generation interval T31 between the pre-injection and the main injection and a heat generation interval T32 between the main injection and the after injection, with which the desired frequency characteristic of the CPL can be obtained. Further, the PCM 70 controls each injector 20 to perform the pre-injection, the main injection, and the after injection at the fuel injection timings corresponding to the time intervals which are set as described above.

Next, a specific example of applying the above-described control of this embodiment is described with reference to FIGS. 11 to 15.

Figure 11:
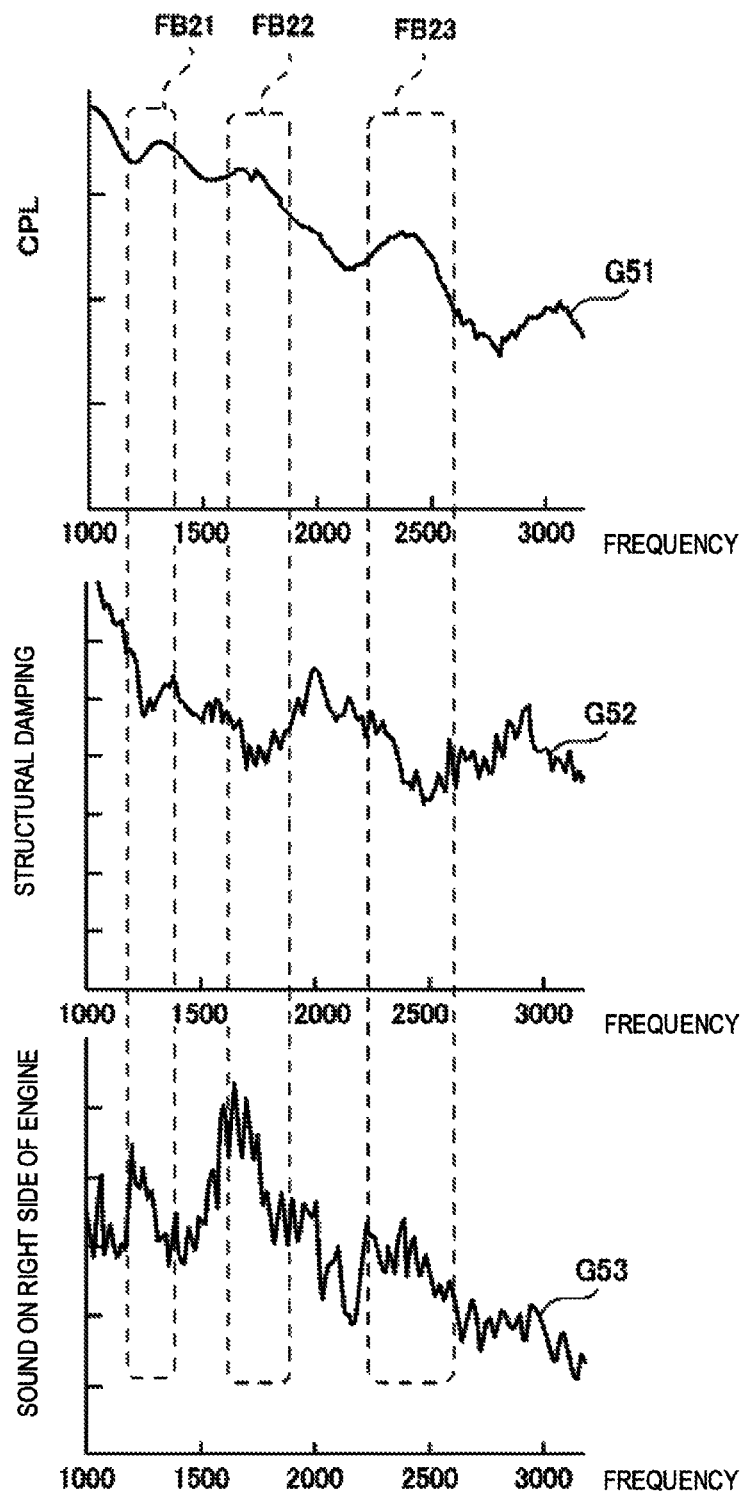
FIG. 11 illustrates one example of an experiment result obtained when reference injection timings are applied.

FIG. 11 illustrates one example of an experiment result obtained when the reference injection timings are applied to the pre-injection, the main injection, and the after injection. In FIG. 11, the chart G51 indicates the frequency characteristic of the CPL, the chart G52 indicates the frequency characteristic of the structural damping of the engine, and the chart G53 indicates the frequency characteristic of sound (corresponding to the knocking noise) produced at a position 1 m on the right side from the engine. Note that as the value of the structural damping of the engine illustrated in the middle of FIG. 11 becomes lower, the influence of the structural system of the engine to cause a louder knocking noise becomes greater, or in other words, as the value of the structural damping becomes higher, the influence of the structural system of the engine to cause louder knocking noise (similar for below) is reduced.

As indicated in the chart G52, it can be understood that within a frequency band FB21 near 1,300 Hz, a frequency band FB22 near 1,700 Hz, and a frequency band FB23 near 2,500 Hz, the structural damping of the engine becomes smaller. Specifically, the influence for the structural system to cause louder knocking noise becomes greater. Each of the frequency bands FB21, FB22, and FB23 can be said to correspond to the resonant frequency band of the structural system of the engine. Within such resonant frequency bands FB21, FB22, and FB23, the knocking sound becomes relatively loud as indicated in the chart G53.

Based on this result, in this embodiment, the time intervals of performing the pre-injection, the main injection, and the after injection are set based on a heat generation interval changed from the heat generation interval used when the reference injection timings are applied, so that the CPL becomes smaller within all the resonant frequency bands FB21, FB22, and FB23 compared to when the reference injection timings are applied. Specifically, in this embodiment, to achieve a frequency characteristic of the CPL in which a frequency corresponding to a valley point of the waveform is included in each of the plurality of resonant frequency bands FB21, FB22, and FB23, the time intervals of performing the pre-injection, the main injection, and the after injection are set based on the heat generation interval for obtaining such a frequency characteristic of the CPL.

Note that the structural system of the engine has another resonant frequency band on the side higher than the resonant frequency band FB23 (e.g., a frequency band near 3,600 Hz). The knocking noise within this resonant frequency band may be reduced by using a natural sound smoother provided in each piston pin.

FIG. 12 is a table illustrating specific examples of the heat generation interval for controlling the valley point of the CPL waveform in this embodiment. Specifically, in FIG. 12, relationships of a plurality of kinds of cycles (msec) of the valley point of the CPL waveform with the heat generation interval (deg) at 1,300 Hz which is within the resonant frequency band FB21 are illustrated in the top section, relationships of a plurality of kinds of cycles (msec) of the valley point of the CPL waveform with the heat generation interval (deg) at 1,700 Hz which is within the resonant frequency band FB22 are illustrated in the middle section, and relationships of a plurality of kinds of cycles (msec) of the valley point of the CPL waveform with the heat generation interval (deg) at 2,500 Hz which is within the resonant frequency band FB23 are illustrated in the bottom section. Each relationship of the cycle of the valley point with the heat generation interval is obtained by using Equation 2 described above.

In this embodiment, among the plurality of heat generation intervals, a heat generation interval which is close to the heat generation interval corresponding to the reference injection timings and with which the CPL waveform can have valley points at the same cycle within a plurality of frequency bands is adopted. As a result, it can be understood that for 1,700 and 2,500 Hz, as framed by the thick lines in FIG. 12, heat generation intervals (8.1 and 9.0 deg) exist, with which the CPL waveform can have valley points at substantially the same cycle (0.9 and 1.0 msec) within the resonance frequency bands which include the two frequencies, respectively. Therefore, in this embodiment, the heat generation interval of 8.5 deg, which is close to 8.1 and 9.0 deg, is adopted for 1,700 and 2,500 Hz so that the CPL waveform has valley points within the resonant frequency bands which include the two frequencies, respectively. As for the other frequency, 1,300 Hz, as framed by the thick line in FIG. 12, a heat generation interval (17.3 deg) which is closest to the heat generation interval corresponding to the reference injection timings, preferably a heat generation interval of 17.5 deg, is adopted so that the CPL waveform has a valley point within the resonant frequency band including 1,300 Hz.

Figure 13:
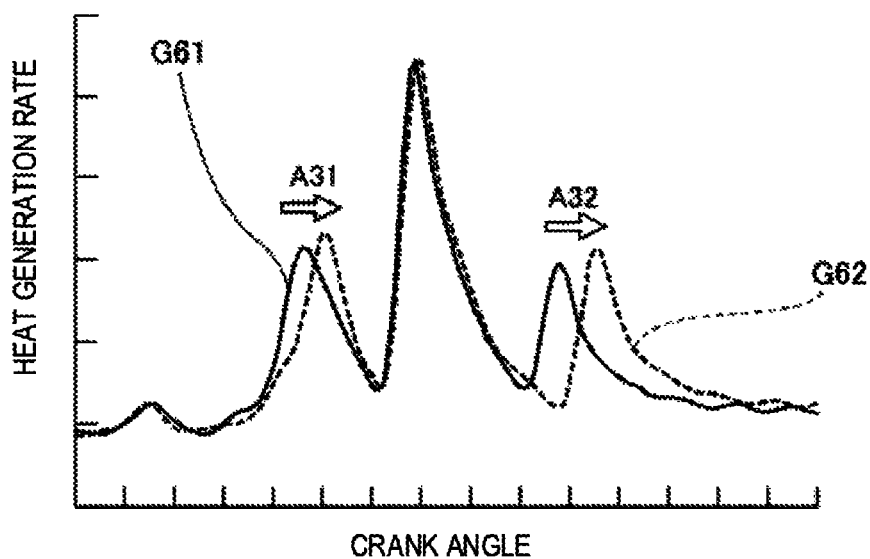
FIG. 13 is a chart illustrating a heat generation rate when the heat generation intervals of the embodiment of the present invention are applied in this embodiment.

FIG. 13 illustrates a specific example of a heat generation rate when the heat generation intervals described above are applied in this embodiment. In FIG. 13, the chart G61 indicates a heat generation rate waveform when the reference injections timings are applied, and the chart G62 indicates a heat generation rate waveform according to this embodiment when the heat generation intervals are changed from the intervals corresponding to the reference injections timings.

In this embodiment, the heat generation interval of 8.5 deg, with which the CPL waveform can have the valley points within the resonant frequency bands which include 1,700 and 2,500 Hz, respectively, is applied for the pre-injection and the main injection. In this case, by retarding the timing of the pre-injection while fixing the timing of the main injection, the heat generation interval corresponding to the reference injection timings is narrowed (see the arrow A31). Further in this embodiment, the heat generation interval of 17.5 deg, with which the CPL waveform can have the valley point within the resonant frequency band which includes 1,300 Hz, is applied for the main injection and the after injection. In this case, by retarding the timing of the after injection while fixing the timing of the main injection, the heat generation interval corresponding to the reference injection timings is widened (see the arrow A32).

Here, a specific example of a method of controlling the timings of the pre-injection, the main injection, and the after injection according to the desired heat generation intervals described above is described. Basically in this embodiment, the timing of the main injection is fixed (e.g., the reference main injection timing is applied), the timing of the pre-injection is changed from the reference pre-injection timing, and the timing of the after injection is changed from the reference after injection timing. In this case, the PCM 70 sets the interval between the pre-injection and the main injection so that the desired heat generation interval caused by the pre-injection and the main injection is achieved. The PCM 70 further sets the interval between the main injection and the after injection so that the desired heat generation interval caused by the main injection and the after injection is achieved. Further, the PCM 70 controls the injectors 20 to perform each of the pre-injection, the main injection, and the after injection at the timings corresponding to the fuel injection intervals which are set as above.

In another example, fuel injection intervals for achieving the desired heat generation intervals described above are obtained by experiments and simulations beforehand, and the obtained fuel injection intervals are stored in a map. Specifically, the interval between the pre-injection and the main injection which achieves the heat generation interval of 8.5 deg is obtained and stored in a map, and the fuel injection interval between the main injection and the after injection which achieves the heat generation interval of 17.5 deg is obtained and stored in the map. Further, the PCM 70 controls the timings of the pre-injection, the main injection, and the after injection based on the interval between the pre-injection and the main injection and the interval between the main injection and the after injection (the reference main injection timing is preferably applied to the main injection).

Figure 14:
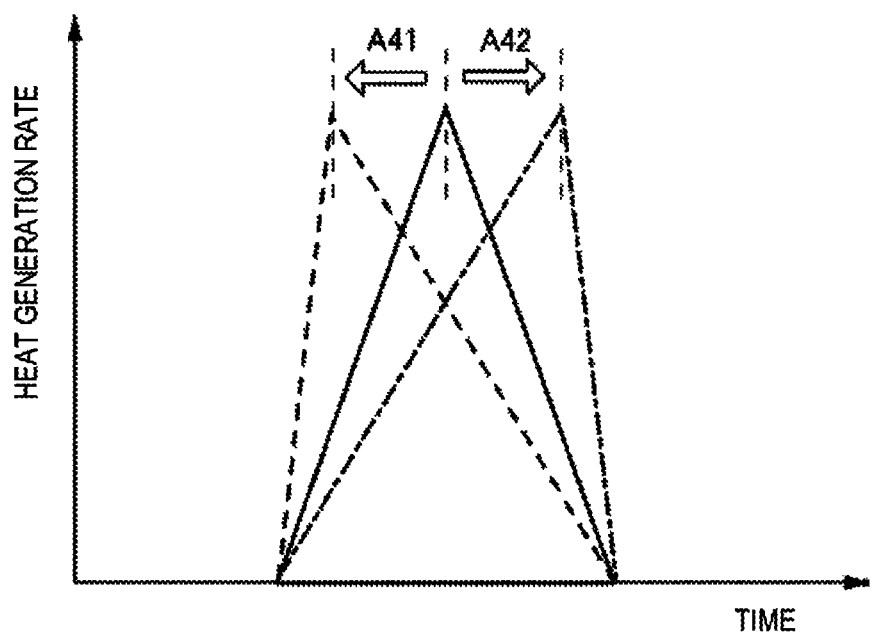
FIG. 14 is a diagram illustrating changes in a heat generation rate waveform under influences of environmental conditions.

Meanwhile, the heat generation rate waveform for defining the heat generation interval changes under influences of various environmental conditions, which is described as follows with reference to FIG. 14. FIG. 14 is a diagram illustrating changes in the heat generation rate waveform under the influences of various environmental conditions. The heat generation rate waveform is schematically illustrated in FIG. 14. The heat generation rate waveform changes according to an in-cylinder temperature in the engine and the intake manifold pressure, for example. Specifically, when the in-cylinder temperature increases, a timing of the heat generation rate waveform reaching its peak advances (see the arrow A41), and when the in-cylinder temperature decreases, the timing of the heat generation rate waveform reaching its peak retards (see the arrow A42). The in-cylinder temperature reflects influences of the intake manifold temperature, a temperature inside the combustion chamber (cylinder wall temperature), the engine coolant temperature, an intake air temperature, an EGR gas temperature, a work load of the turbocharger, etc. Further, when the intake manifold pressure increases, the timing of the heat generation rate waveform reaching its peak advances (see the arrow A41), and when the intake manifold pressure reduces, the timing of the heat generation rate waveform reaching its peak retards (see the arrow A42). The intake manifold pressure reflects influences of atmospheric pressure, turbocharging pressure, etc.

When the timing of the heat generation rate waveform reaching its peak changes according to the in-cylinder temperature, the intake manifold pressure, etc. as above, the heat generation interval also changes. Therefore, the heat generation intervals for achieving the desired frequency characteristic of the CPL may be set in consideration of the timing, at which the heat generation rate waveform reaches its peak, changing according to the in-cylinder temperature, the intake manifold pressure, etc., or in other words, the intervals may be set based on the in-cylinder temperature, the intake manifold pressure, etc. For example, in the method of using the map described above, the fuel injection interval between the pre-injection and the main injection and the fuel injection interval between the main injection and the after injection for achieving the desired heat generation intervals may be defined for each of the in-cylinder temperature and the intake manifold pressure in the map.

Although the method of controlling the fuel injection intervals by using the map is described above, in another example, actual heat generation intervals may be obtained based on detection value(s) of sensor(s), and the fuel injection interval between the pre-injection and the main injection and the fuel injection interval between the main injection and the after injection may be feedback controlled to be target heat generation intervals for achieving the desired frequency characteristic of the CPL (hereinafter, suitably referred to as the "target heat generation intervals"). In this case, a waveform of the in-cylinder pressure with respect to the crank angle may be obtained using an in-cylinder pressure sensor, a heat generation rate may be obtained by differentiating the waveform of the in-cylinder pressure, and the actual heat generation intervals may be obtained based on the heat generation rate. Further, the target heat generation intervals may be values obtained based on the in-cylinder temperature, the intake manifold pressure, etc.

In yet another example, the actual heat generation intervals may be estimated by using a predetermined model and not using the sensor(s), and the fuel injection interval between the pre-injection and the main injection and the fuel injection interval between the main injection and the after injection may be feedback controlled to be the target heat generation intervals. In this case, by using, for example, a combustion model, an ignition delay of the injected fuel may be obtained and an inclination and height of the heat generation rate waveform may be predicted, and the actual heat generation intervals may be estimated based on the ignition delay and the inclination and height. Further, the target heat generation intervals may be values obtained based on the in-cylinder temperature, the intake manifold pressure, etc.

Note that the reason why the heat generation interval between the pre-injection and the main injection is controlled so that the CPL waveform has the valley point within the resonant frequency band including 1,700 Hz (also within the resonant frequency band including 2,500 Hz) as described above is as follows. When the heat generation interval between the pre-injection and the main injection is controlled, a reducing effect of the knocking noise is higher than when the heat generation interval between the main injection and the after injection is controlled. This is because while the main injection causes the largest combustion energy among the pre-injection, the main injection, and the after injection, at the timing of performing the after injection, the energy caused by the main injection becomes low (since the combustion energy gradually attenuates over time), which causes the entire combustion energy to be low, whereas, at the timing of performing the main injection after the pre-injection, high energy caused by the main injection is secured, which causes the entirety of the combustion energy to be very high. On the other hand, in this embodiment, the knocking noise at 1,700 Hz is prioritized for noise reduction among the knocking noises at 1,300, 1,700, and 2,500 Hz. Therefore, in this embodiment, by controlling the heat generation interval between the pre-injection and the main injection, which exerts the high reducing effect of the knocking noise, the CPL waveform has the valley point within the resonant frequency band including 1,700 Hz prioritized for the knocking noise reduction.

Figure 15:
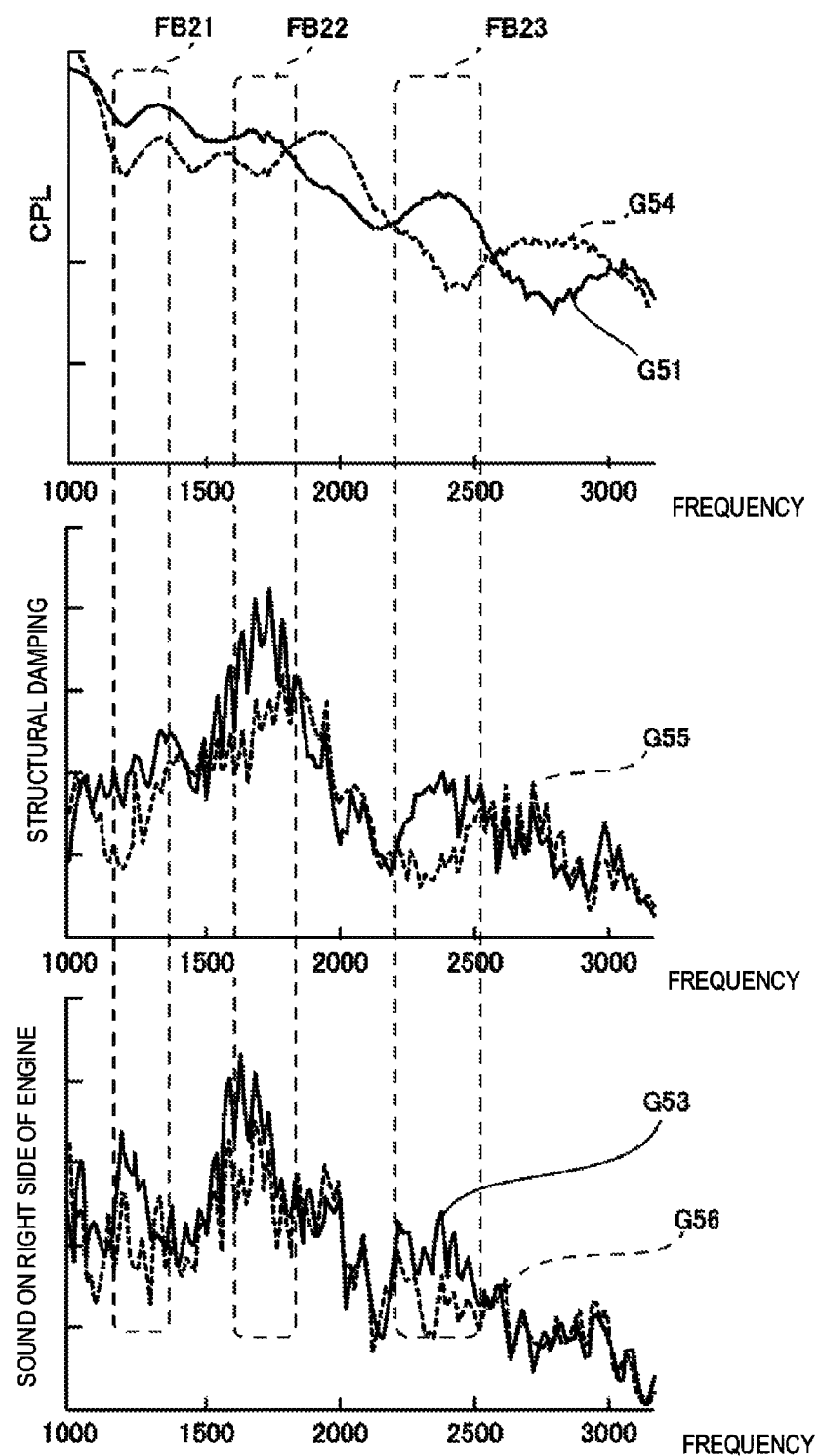
FIG. 15 shows diagrams illustrating operations and effects of the embodiment of the present invention.

Next, operations and effects of this embodiment described above are described with reference to FIG. 15. FIG. 15 is one example of an experiment result obtained when the fuel injection intervals corresponding to the heat generation intervals for achieving the desired frequency characteristic of the CPL are applied with the method described with reference to FIGS. 12 to 14. In FIG. 15, the chart G54 indicates the frequency characteristic of the CPL in this embodiment, the chart G55 indicates the frequency characteristic of the structural damping in this embodiment, and the chart G56 indicates the frequency characteristic of sound (corresponding to the knocking noise) produced at the position 1 m on the right side from the engine in this embodiment. On the other hand, the charts G51 to G53 are similar to those of FIG. 11, or in other words, the result of the case where the reference injection timings are applied is indicated.

According to this embodiment, it can be understood that the frequency characteristic of the CPL in which the frequency corresponding to the valley point of the waveform is included in each of the resonant frequency bands FB21, FB22, and FB23 which correspond to the resonant frequency bands of the structural system of the engine is achieved as indicated in the chart G54. In other words, according to this embodiment, it can be understood that the CPL is lower within the frequency bands FB21, FB22, and FB23 compared to the chart G51 applying the reference injection timings. Therefore, according to this embodiment, it can be understood that the knocking noise is suitably reduced within the resonant frequency bands FB21, FB22, and FB23 compared to the chart G53 applying the reference injection timings as indicated in the chart G56. In this case, according to this embodiment, since the frequency characteristic of the CPL is controlled and the CPL is not entirely changed, the knocking noise can suitably be reduced without degrading the fuel consumption and the emission performance and also without increasing in cost and weight of the apparatus. Further according to this embodiment, the frequency characteristic of the CPL can suitably be controlled, particularly a plurality of frequencies regarding the CPL can be controlled simultaneously, while utilizing the conventional combustion mode which includes the pre-injection, the main injection, and the after injection.

<Modifications>

Hereinafter, modifications of this embodiment are described.

In the embodiment described above, the timings of the pre-injection and the after injection are changed while fixing the timing of the main injection so as to achieve the desired heat generation interval; however, in another example, the timing of the main injection may also be changed if, for example, the desired heat generation interval is difficult to achieve by simply changing the timings of the pre-injection and the after injection.

In the embodiment described above, the heat generation interval between the pre-injection and the main injection and the heat generation interval between the main injection and the after injection are controlled to achieve the desired frequency characteristic of the CPL. However, in another example, the heat generation interval between the pre-injection and the main injection may solely be controlled without controlling the heat generation interval between the main injection and the after injection (in this case, the after injection may be omitted in the first place), or the heat generation interval between the main injection and the after injection may solely be controlled without controlling the heat generation interval between the pre-injection and the main injection (in this case, the pre-injection may be omitted in the first place). In yet another example, the fuel may be injected at least twice before the main injection and the desired frequency characteristic of the CPL may be achieved by controlling the heat generation interval of the at least two fuel injections. Moreover, in still another example, the fuel may be injected at least twice after the main injection and the desired frequency characteristic of the CPL may be achieved by controlling heat generation intervals of the at least two fuel injections. In summary, the desired frequency characteristic of the CPL may be achieved by injecting the fuel a plurality of times to cause a plurality of combustions, and controlling the heat generation interval caused by the plurality of combustions.

In the embodiment described above, the frequency characteristic of the CPL is controlled based on the plurality of resonant frequency bands of the structural system of the engine. In other words, the frequency characteristic of the CPL is controlled so that the frequencies corresponding to the valley points of the waveform indicating the frequency characteristic of the CPL are included in the plurality of resonant frequency bands of the structural system of the engine, respectively. In another example, the frequency characteristic of the CPL (e.g., the timings of the plurality of fuel injections) may be designed first, and then the structural system of the engine may be designed so that a plurality of resonant frequency bands of the structural system of the engine are located within frequency bands corresponding to valley points of a waveform indicating the frequency characteristic of the CPL.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
4 Piston
7 Crankshaft
8 Connecting Rod
20 Injector
30 Intake Passage
40 Exhaust Passage
60 Turbocharger
70 PCM

What is claimed is:

1. A fuel injection control apparatus for an engine in which fuel is injected into a cylinder a plurality of times to cause a plurality of combustions, comprising:
   a controller for controlling a time interval of performing a plurality of fuel injections so that, for each of the plurality of combustions, a waveform indicating a frequency characteristic of a combustion pressure wave that is produced by the combustions has valley points that occur at frequencies included within a plurality of resonant frequency bands of an overall structural configuration of the engine.

2. The apparatus of claim 1, wherein the controller controls the time interval of performing the plurality of fuel injections to overlap a mountain point of a first combustion pressure wave with a valley point of a second combustion pressure wave within each of the plurality of resonant frequency bands, so that the frequencies of the valley points of the waveform indicating the frequency characteristic of each combustion pressure wave are included in the plurality of resonant frequency bands, respectively, the first combustion pressure wave and the second combustion pressure wave produced by two of the plurality of combustions that are adjacent to each other in terms of timing.

3. The apparatus of claim 2, wherein the controller controls the time interval of performing the plurality of fuel injections to achieve a target time interval at which a heat generation rate caused by each of the plurality of combustions reaches a highest value, so that the frequencies of the valley points of the waveform are included in the plurality of resonant frequency bands, respectively.

4. The apparatus of claim 3, wherein the controller obtains, as the target time interval, the time interval at which the heat generation rate reaches the highest value based on a temperature inside the cylinder of the engine and pressure inside an intake manifold of the engine, and controls the time interval of performing the plurality of fuel injections to achieve the target time interval.

5. A fuel injection control apparatus for an engine in which fuel is injected into a cylinder a plurality of times to cause a plurality of combustions, comprising:
   a controller for controlling a time interval of performing a plurality of fuel injections based on a time interval at which a heat generation rate caused by the plurality of combustions reaches a highest value, so that, for each of the plurality of combustions, a waveform indicating a frequency characteristic of a combustion pressure wave produced by the combustions has valley points that occur at frequencies included within a plurality of resonant frequency bands of a structural system of the engine.

6. The apparatus of claim 5, wherein the controller obtains timings at which the heat generation rate reaches the highest value based on a temperature inside the cylinder of the engine to obtain the interval of the timings, each of the timings being advanced as the temperature inside the cylinder becomes higher.

7. The apparatus of claim 6, wherein the controller obtains timings at which the heat generation rate reaches the highest value based on pressure inside an intake manifold of the engine to obtain the interval of the timings, each of the timings being advanced as the pressure inside the intake manifold becomes higher.

8. A fuel injection control apparatus for an engine in which fuel is injected into a cylinder a plurality of times to cause a plurality of combustions, comprising:
   a controller for controlling reference injection timings of a plurality of fuel injections based on at least an operating state of the engine,
   wherein the controller changes the reference injection timings by controlling a time interval of performing the plurality of fuel injections so that within a resonant frequency band of a structural system of the engine, a combustion pressure wave produced by the combustions indicates a peak value lower than that of a combustion pressure wave produced when the reference injection timings are applied unchanged.

9. The apparatus of claim 8, wherein among a plurality of fuel injection time intervals at which the combustion pressure wave indicates a peak value lower than when the reference injection timings are applied unchanged within the resonant frequency band, the controller applies a time interval that is closest to the fuel injection time interval corresponding to the reference injection timings.

* * * * *